June 26, 1951  L. R. BUCKENDALE  2,557,937
DRIVE AXLE
Filed July 19, 1945  3 Sheets-Sheet 1
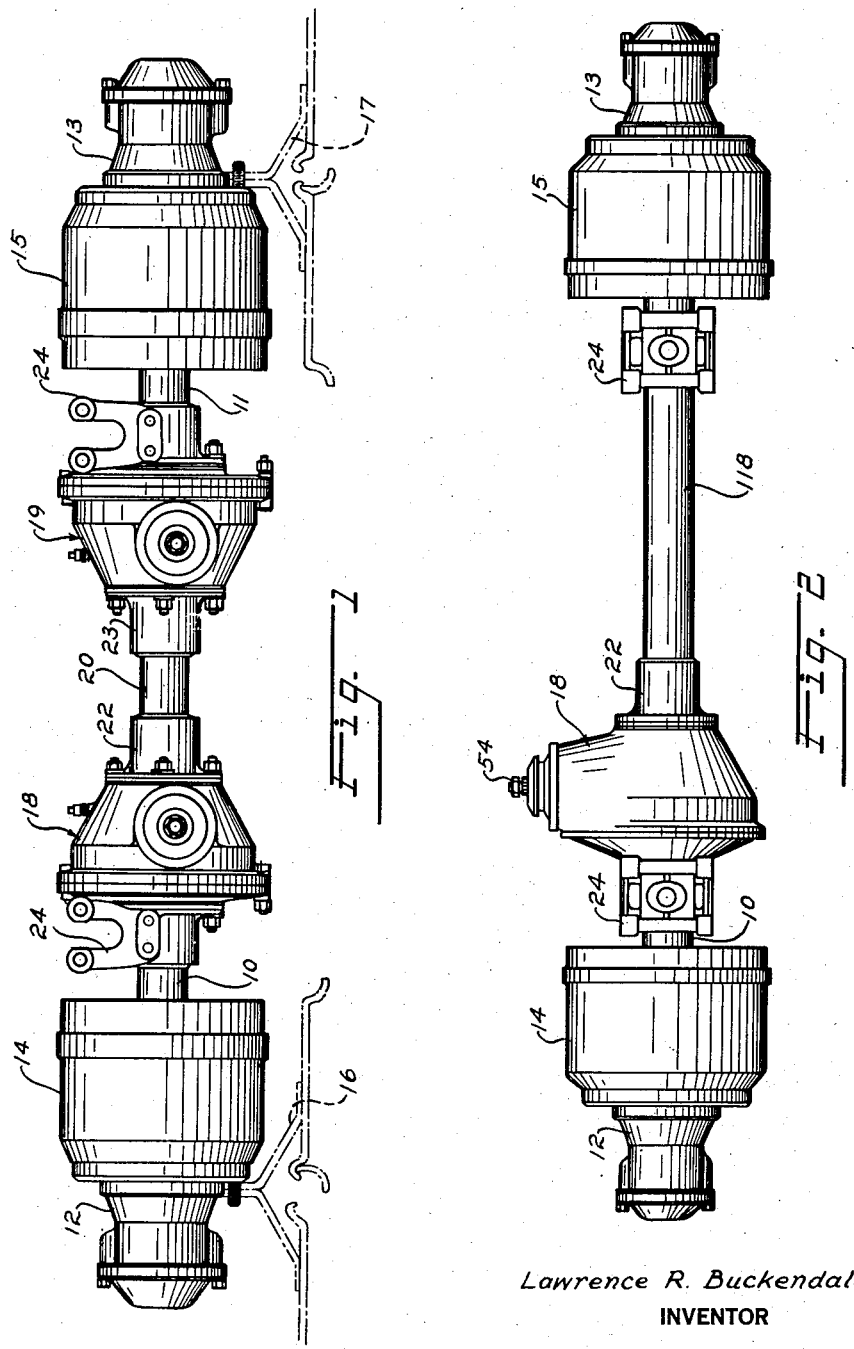
Lawrence R. Buckendale
INVENTOR
BY Strauch & Hoffman
ATTORNEYS

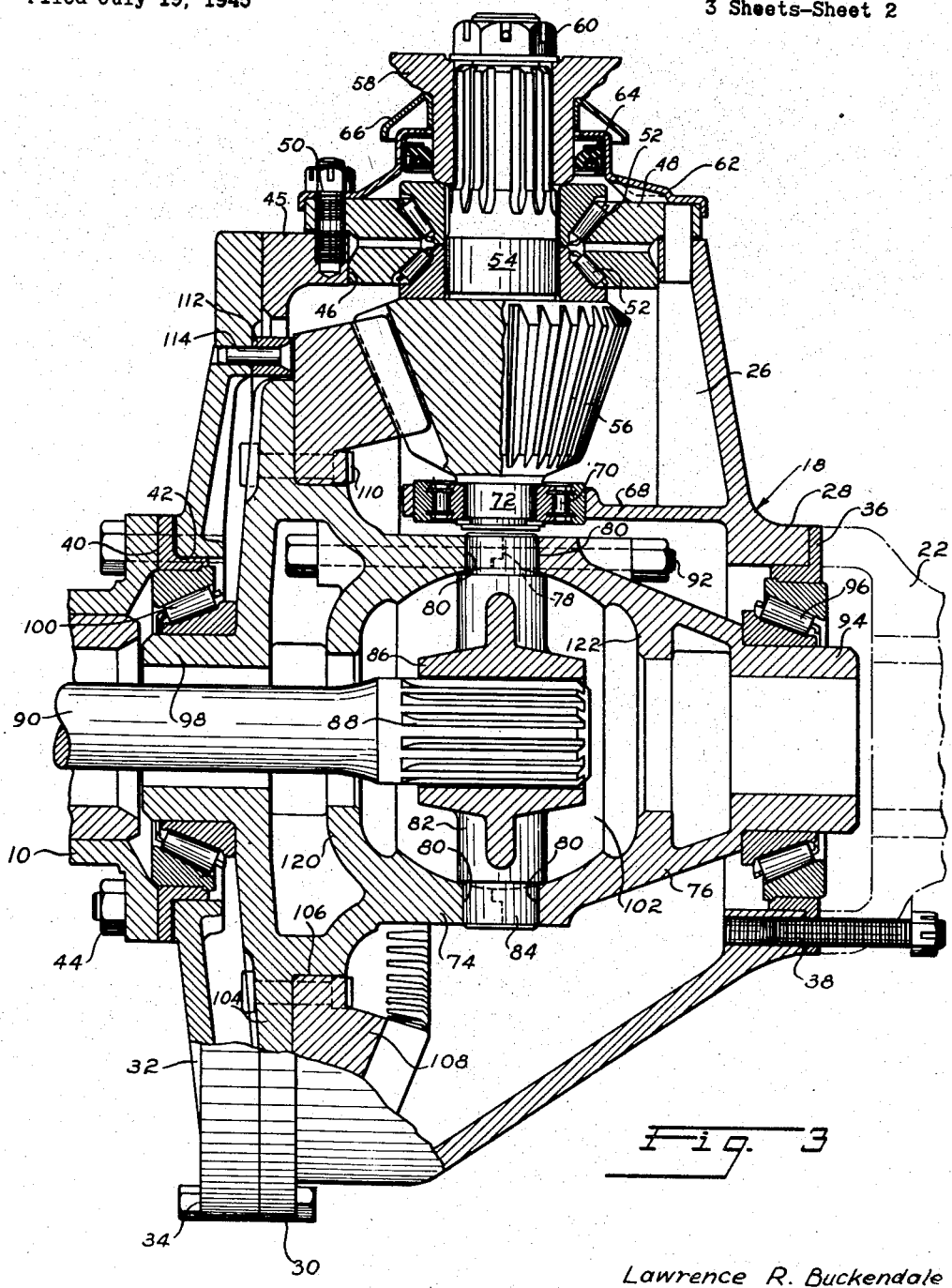

June 26, 1951 L. R. BUCKENDALE 2,557,937
DRIVE AXLE
Filed July 19, 1945 3 Sheets-Sheet 3

Lawrence R. Buckendale
INVENTOR

BY *Strauch + Hoffman*
ATTORNEY

Patented June 26, 1951

2,557,937

UNITED STATES PATENT OFFICE 2,557,937

DRIVE AXLE

Lawrence R. Buckendale, Detroit, Mich., assignor to The Timken-Detroit Axle Company, Detroit, Mich., a corporation of Ohio Application July 19, 1945, Serial No. 605,948

4 Claims. (Cl. 74—713)

This invention relates to vehicle drive axles, more particularly for heavy duty vehicles, and has for its general object and purpose to provide a drive axle assembly with standardized gear and axle bowl structures, which can be easily and quickly converted for use in single or dual motor driven vehicles.

The application of dual drive rear axles to heavy duty vehicles having a legally permissible maximum overall width of ninety-six inches has heretofore been found quite expensive and attended with difficulties mainly due to space limitations. In such dual drive axles each motor may drive an opposite side of the axle necessitating a double bowl axle structure, or both motors may drive through a differential located in a common axle bowl. For many purposes a double bowl axle has been considered desirable but prior designs have proved so bulky that, in order to observe the legal restrictions on vehicle width, a single bowl axle had to be used. Furthermore prior dual drive axles designs were invariably expensive and of such special construction that they could not also be adapted to the single drive type of axle in which the single propeller or drive shaft is operatively connected with the two wheel axle shafts by conventional differential gearing mounted within the housing.

Therefore, it is a major object of my present invention to provide an axle housing structure for alternative use in either single or dual drive axles which is of such construction and dimensions that when employed in a dual motor drive vehicle, individual axle bowls are satisfactorily mounted within the overall legal vehicle width and disposed for the most effective transmission of power to the individual drive wheel of the assembly.

A more particular object of the invention resides in the provision of a novel ring gear carrier journaled within an axle bowl together with two axle shaft driving means interchangeably connectible with said ring gear carrier for selectively establishing a differential driving connection between said carrier and two opposite wheel driving axle shafts, or a direct driving connection between said carrier and a single one of the wheel driving shafts.

It is a further object of the invention to provide a novel axle bowl of minimum diameter and axial length with means for mounting the gearing of the required ratio therein for either single or dual motor drive, and insuring maximum operating efficiency in the transmission of the driving power to the vehicle wheels.

It is an additional object of the invention to provide an axle bowl and axle driving unit mounted therein in novel assembly, the several parts of which are standardized for use in either a single or dual drive axle assembly so that by such interchangeability it is necessary to stock only a comparatively small number of parts for replacement or servicing of both types of axles.

It is further the aim and purpose of the present invention to provide a convertible axle drive and housing assembly as above characterized, the several parts of which are of simple and rugged mechanical form so that production costs and maintenance expense will be reasonably low.

With the above and other objects in view, the invention comprises my novel vehicle drive axle and the construction and relative arrangement of its several cooperating parts, as will hereinafter be more fully described, illustrated in the accompanying drawings and subsequently incorporated in the subjoined claims.

In the drawings wherein I have disclosed a simple and satisfactory preferred embodiment of my present improvement, and in which similar reference characters designate corresponding parts throughout the several views:

Figure 1 is a front side elevation of a dual drive axle according to a preferred embodiment of the invention, having spaced gear housings of my novel construction;

Figure 2 is a plan view of the axle of Figure 1 converted to a single drive type of axle in which only one of the gear housings shown in Figure 1 is assembled;

Figure 3 is an enlarged horizontal section of the axle bowl and drive gearing assembled therein for the independent dual motor drive of the vehicle wheels as in the Figure 1 assembly;

Figures 4, 5:
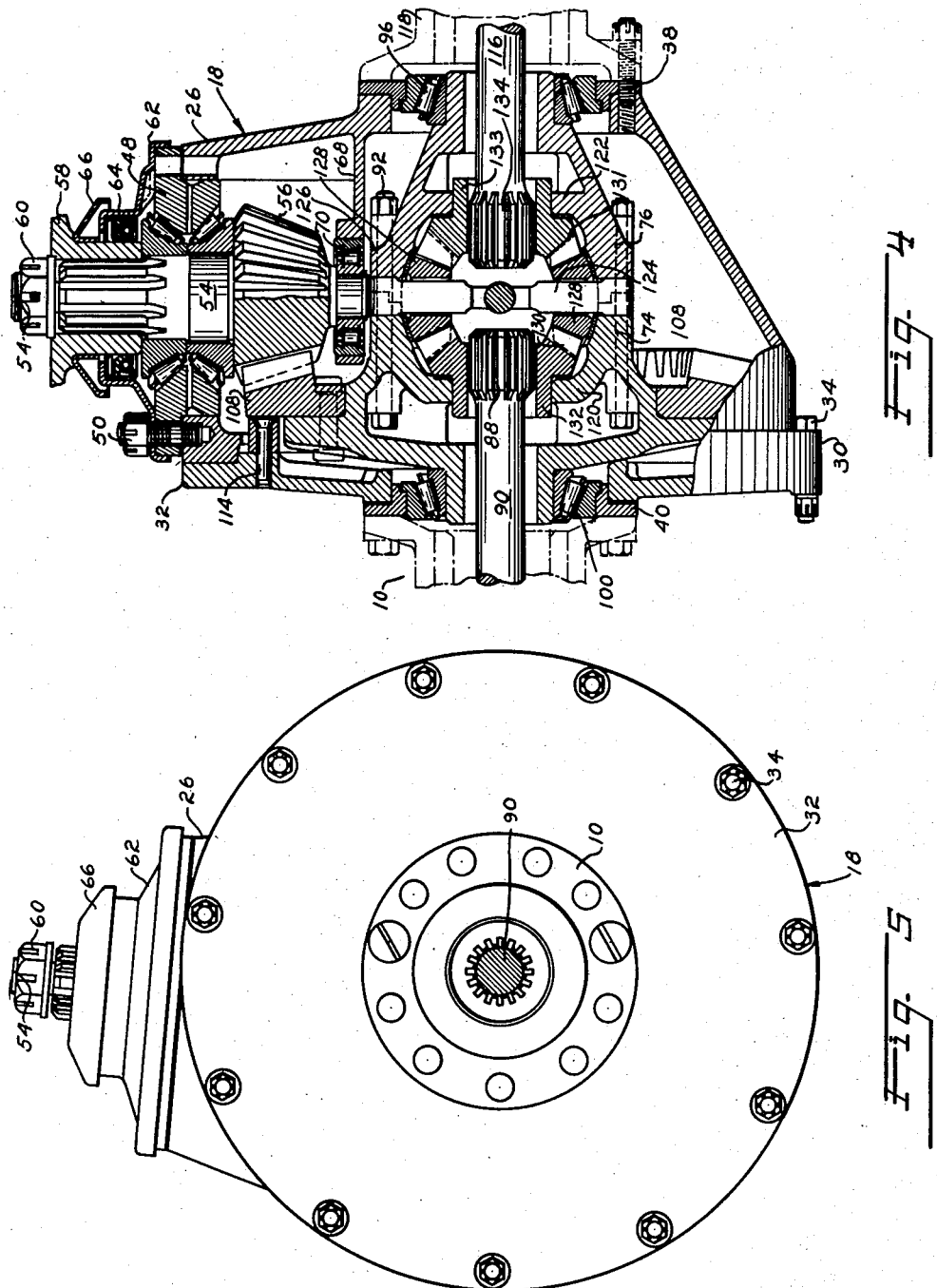
Figure 4 is a similar view on a reduced scale of the same axle bowl as converted with differential drive gearing assembled therein for single motor drive of the vehicle wheels.
Figure 5 is an end elevation of one of the axle bowls.

Referring first to the general assembly of the dual drive axle illustrated in Figure 1 of the drawings, two wheel axle drive shafts extend through tubular axle housing portions 10 and 11 and are rigidly connected at their outer ends in conventional manner with wheel hubs 12 and 13 which are journaled on the outer ends of housings 10 and 11. To the inner ends of the respective hubs 12 and 13, brake drums 14 and 15 are rigidly bolted, a suitable brake applying mechanism being mounted internally of said drums upon the axle housings. The vehicle wheels, indicated at 16 and 17 are also rigidly bolted to the hubs in a manner well known in the art. While I have indicated dual tired wheels in the drawings, it will of course be apparent that the present invention is equally applicable to a single tired wheel.

The inner ends of the respective axle housings 10 and 11 are rigidly secured to the outer ends of a pair of similar but oppositely disposed axle bowls 18 and 19. Each of these bowls contains drive gearing for the associated wheel axle, and will presently be fully described in detail. As herein shown, the bowls 18 and 19 have a general inwardly tapering configuration, and the inner spaced apart ends of said bowls are rigidly joined by a central hollow tubular rigid stabilizing member 20 having flanged reinforcing sleeves 22 and 23 at its opposite ends bolted to the respective housing structures.

In the present instance I have shown spring suspension bracket members 24 mounted on the axle housing at the outer side of each bowl. Torsion rods constituting parts of the vehicle suspension system may be suitably attached to brackets 24. However, it will be understood that these brackets do not constitute essential parts of the present invention.

In Figure 3 of the drawings, the axle bowl 18 is illustrated in enlarged detail, and it will be understood that similar construction is provided within bowl 19. Axle bowl 18 is of the split axle housing type and comprises a body section 26 formed at its inner side with a tubular boss 28. At its outer side this axle housing section 26 is open and formed with a bolting flange 30 to which a cover section 32 of the axle housing is detachably secured, as by the bolts indicated at 34.

A flanged bearing support 36 is fitted within tubular boss 28 and secured thereto by the attaching bolts 38 for the end of connecting member 20. A similar bearing support 40 is also fitted within the central opening 42 in the axle housing cover section 32 and is secured thereto by bolts 44 also connecting the inner end of the axle housing portion 10 with bowl 18.

At its front side, the wall 45 of the housing section 26 is provided with a circular opening 46 receiving a flanged bearing support 48 secured to the housing wall 45 as by cap screws 50 and in which suitable anti-friction roller bearings 52 are mounted, providing a journal for the pinion drive shaft 54. This shaft at its inner end has a bevel pinion 56 rigid therewith.

The outer end portion of shaft 54 is splined to receive the hub of a flanged coupling member 58 retained thereon by a nut 60. Flanged member 58 is connected by the usual flexible coupling with the rear end of a propeller shaft. A sheet metal oil seal support and cap member 62 surrounds the hub of bearing support 48 and is attached at its outer edge by the screws 50 to member 48. Within this cap member and between the same and the periphery of the flanged coupling member 58 a suitable type of oil seal 64 is contained. A dust guard and oil slinger 66 is fixed to the hub of member 58 and extends over the outer end of cap member 62.

Housing section 26 is formed with an internal web 68 in which a pilot bearing 70 is mounted to rotatably receive and support a stub shaft 72 formed on the inner end of the pinion 56.

Within the axle bowl a ring gear carrier is rotatably mounted. As herein shown, this carrier comprises two sections 74 and 76, respectively, in axially opposed relation and abutting at their confronting ends in the scarf joint 78. At diametrically opposite points, these abutting ends of the carrier sections are formed with mating semi-circular recesses 80, which, in the assembly of Figure 3, receive the diametrically reduced ends 84 of the radial arms 82 of a spider, said arms radiating integrally from an internally splined sleeve 86 coaxial with housing portions 10 and 20. In sleeve 86, the splined inner end 88 of one of the wheel axle shafts 90 is received. Registering openings in the carrier sections 74 and 76 receive connecting bolts 92 whereby the two carrier sections and spider are connected in rigidly assembled relation.

The inner carrier section 76 at its outer end has a reduced hub extension 94 journaled in an anti-friction bearing 96 mounted in support 36. Similarly carrier section 74 is provided at its outer end with a hub extension 98 which is journaled in an anti-friction bearing 100 mounted in support 40. The opposing ends of the two gear carrier sections 74 and 76 are internally formed to provide a space or chamber 102 of sufficient dimensions to receive the pinions and side gears of a differential gearing when used in a single drive axle as will be presently described.

The carrier section 74 is cored to reduce the weight thereof and is formed with a radial flange 104 and a shoulder 106 at the inner side of said flange against which a bevel ring gear 108 is seated and rigidly secured to said flange as by bolts or rivets indicated at 110. This ring gear is in constant mesh with pinion 56. Wear plate 112 behind the point of contact of ring gear 108 and pinion 56 supports the ring gear against the thrust of the pinion. It is secured to the cover section 32 and located by a pin 114.

It is apparent from the above that since ring gear 108 is rigid with the associated axle shaft, if desired gear 108 may be integral with carrier section 74, the vehicle wheel shaft at that side will be driven by the associated motor at a speed determined by the ratio of the gears 56 and 108. The arrangement is similar at each side of the axle for dual motor drive.

The novel axle bowl structure above described may be easily and quickly assembled with the axle drive gearing and provides a housing of minimum axial dimension so that ample space will be available for the mounting of the two bowls in spaced apart relation with the rigid connecting or stabilizing member 20 within the legal overall maximum vehicle width of 96 inches and with the use of conventional power transmitting connections between the two motors and the respective pinion shafts 54. Owing to the comparatively small size of the bowls 18 and 19, no alterations in the structure or location of standard vehicle accessories in the immediate vicinity of the wheel axle assembly will be required in order to insure their efficient functional operation.

In the application of the present invention for use in a single motor driven axle, in which rotation is transmitted to both wheel axle shafts through differential gearing, only one of the bowls is mounted in the axle assembly at one side of the vehicle centerline, bowl 18 being so illustrated in Figure 2 of the drawings. Therefore, instead of providing two axle shafts 90 of equal length as in Figure 1, one of the axle shafts 116 (Figure 4) must be of greater length than the other, and a correspondingly long tubular axle housing portion 118 is provided about shaft 116 between bowl 18 and hub 13, member 20 and short housing portion 11 of course being omitted. The same sleeve 22 may be used for securing the inner end of housing 118 to bowl 18, being rigidly bolted to the inner end of the bowl 18 in similar manner to member 20 above described.

Referring now to Figure 4, it will be noted that in bowl 18, the mounting of the pinion shaft 54 and the construction of the carrier for the ring gear 108 is identical to that shown in Figure 3, so that the parts are readily interchangeable for use in either single or dual drive axles. The ring gear carrier sections 74 and 76 are formed with internal webs 120 and 122, respectively, at opposite ends of chamber 102. In converting the drive from a dual to a single motor, the solid drive spider directly connecting the ring gear carrier with the wheel axle shaft 90 illustrated in Figure 3 is omitted, and a standard type differential spider 124, as shown in Figure 4, is substituted therefor. Each of the four radial arms of this spider 124 has a diametrically enlarged cylindrical outer end 126 which is adapted to be rigidly clamped or secured between the abutting ends of the two ring carrier sections 74 and 76 as above described. Upon each arm of spider 124 a bevel differential pinion 128 is journaled for free rotation. These pinions are in constant mesh with the bevel side gears 130 and 131 having hub portions 132 and 133 journaled in the webs 120 and 122 of the respective carrier sections 74 and 76. Each of these side gears is internally splined, gear 130 being engaged with the splined end 88 of the short wheel axle shaft 90, and side gear 131 being internally splined for engagement with the splined end 134 of the long wheel axle shaft 116. It will be evident that when the parts are thus assembled, the gearing will function in the well known manner to differentially transmit the power from a single motor coupled to shaft 54 to the wheel axle shafts 90 and 116.

From the above, the many advantages of the present invention will be apparent. In addition to the novel small size bowl structure, by the provision of means for selectively establishing a direct driving connection between the ring gear carrier and the single wheel axle shaft for use in a dual drive axle, or for connecting said ring gear carrier for the differential drive of both wheel axle shafts in a single drive axle, most of the parts may be of standardized construction for interchangeable use in both types of axles.

The construction of the axle bowl and the ring gear carrier provides an unusually compact assembly and arrangement of the driving connections between the pinion shaft 54 and the wheel axle shaft or shafts. Of course, it is understood that suitable provisions are made for the adequate lubrication of the several shaft bearings so that the mechanism will at all times function with maximum efficiency. An appreciable reduction in manufacturing costs and storage space for parts is realized by the interchangeability of the parts for use in single or dual drive axles, and it is necessary to carry in stock only a relatively small number of parts for replacement in either type of axle. Also, expense incident to the proper servicing of both light and heavy duty vehicles will be materially reduced.

My special axle construction enables speedy assembly of the parts into either dual or single drive assembly. The axially narrow bowls 18 and 19 leave plenty of space for attachment of springs brake operators and like accessories.

While bowl 18 has been illustrated in Figure 2 as in the type of drive where the propeller shaft is disposed to one side of the longitudinal centerline of the vehicle, the bowl can be located anywhere along the axle simply by choice of suitable axle shaft and housing section lengths. The ring gear carrier 74, 76 serves as both a support for the solid drive spider, and as a differential cage without modification.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination with an axle housing bowl; a hollow differential gear carrier having an axially extending hub at each end journalled in said housing bowl, said hollow carrier being in two parts having mating engagement in a transverse plane; means for securing said parts rigidly together; wheel axle means extending through said housing and into said carrier; webs integral with said carrier parts and extending inwardly between said hubs and said transverse plane to form a chamber within the carrier and journals for differential side gears within said chamber; and means in said chamber drivingly connecting said gear carrier with said wheel axle means, including a power transmitting member affixed to said wheel axle means, means rigidly securing said member to said carrier between the two parts thereof; and means for drivingly connecting said gear carrier to a power source.

2. The combination defined in claim 1 wherein said power transmitting member has an axial splined opening to receive the splined end portion of said drive axle means.

3. In combination with an axle housing, a hollow differential gear carrier having an axially extending hub at each end journalled in said housing, said hollow carrier comprising two separable sections secured together along a substantially transverse plane, wheel axle means extending through said housing and into said carrier, webs integral with said carrier sections and extending radially inwardly between said hubs and said plane to form a chamber within said carrier, and means in said chamber drivingly connecting said gear carrier with said axle means including a power transmitting member affixed to said wheel axle means, means rigidly securing said member to said carrier between the two parts thereof, and means for drivingly connecting said gear carrier to a power source.

4. In a drive axle, a housing having an enlarged portion, a hollow ring gear carrier having hubs at opposite ends journalled in said enlarged housing portion, said carrier comprising two sections rigidly but removably secured together, a spider within said carrier having radial arms clamped between said carrier sections, integral webs projecting radially within said carrier at opposite sides of said spider and spaced with respect to said hubs, an axle shaft projecting freely through one of said hubs and the adjacent web, and supporting means for said axle shaft drivingly connecting said axle shaft to said spider within said carrier.

LAWRENCE R. BUCKENDALE.

REFERENCES CITED

The following references are of record in the file of this patent:

UNITED STATES PATENTS

| Number    | Name      | Date           |
|-----------|-----------|----------------|
| 1,017,407 | Grabowsky | Feb. 13, 1912  |
| 1,430,251 | Parker    | Sept. 26, 1922 |
| 1,435,910 | Ballard   | Nov. 21, 1922  |
| 1,481,405 | Anglada   | Jan. 22, 1924  |
| 1,679,213 | Fowler    | July 31, 1928  |
| 1,906,613 | Keese     | May 2, 1933    |
| 2,101,631 | Sarff     | Dec. 7, 1937   |
| 2,126,255 | Hacker    | Aug. 9, 1938   |
| 2,166,099 | Quartullo | July 11, 1939  |
| 2,203,282 | Keese     | June 4, 1940   |
| 2,268,601 | Knox      | Jan. 6, 1942   |
| 2,300,424 | Jones     | Nov. 3, 1942   |